US012639947B2

(12) United States Patent
Zhao et al.

(10) Patent No.: US 12,639,947 B2
(45) Date of Patent: May 26, 2026

(54) PERSONALIZED GENERATIVE VIDEO SUMMARIZATION

(71) Applicant: Samsung Electronics Co., Ltd., Suwon-si (KR)

(72) Inventors: Xiangyuan Zhao, Irvine, CA (US); Brian Chen, Irvine, CA (US); Yingnan Zhu, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/924,055

(22) Filed: Oct. 23, 2024

(65) Prior Publication Data

US 2025/0278939 A1 Sep. 4, 2025

Related U.S. Application Data

(60) Provisional application No. 63/561,254, filed on Mar. 4, 2024, provisional application No. 63/550,510, filed on Feb. 6, 2024.

(51) Int. Cl.
*G06V 20/40* (2022.01)
*G06V 10/80* (2022.01)
(Continued)

(52) U.S. Cl.
CPC ............ *G06V 20/47* (2022.01); *G06V 10/806* (2022.01); *G06V 20/41* (2022.01);
(Continued)

(58) Field of Classification Search
CPC ...... G06V 20/47; G06V 10/806; G06V 20/41; G06V 10/776; G06V 10/82; H04N 21/25891; H04N 21/8549
(Continued)

(56) References Cited

U.S. PATENT DOCUMENTS 11,475,667 B2 * 10/2022 Yakupov ................ G06V 20/46
11,582,485 B1 2/2023 Cherian et al.
(Continued)

FOREIGN PATENT DOCUMENTS

CN 115410130 A 11/2022
JP 2007-511854 A 5/2007
(Continued)

OTHER PUBLICATIONS

International Search Report and Written Opinion of the International Searching Authority dated Apr. 15, 2025, in connection with International Application No. PCT/KR2025/000668, 9 pages.

*Primary Examiner* — Helen Shibru

(57) ABSTRACT

A method includes generating a multimedia content result using a streaming multimodal video generation model, including creating prompt text based on one or more user preferences, generating image frames based on the prompt text, compiling the image frames into the multimedia content result, and displaying the multimedia content result. The method can also include acquiring video data and audio data associated with a multimedia content item, performing a first scene detection process on the video data, performing a second scene detection process on the audio data, determining combined scene detection results based on the first scene detection results and the second scene detection results, inputting at least a portion of the combined scene detection results into a genre-specific multimodal transformer (GMT)

(Continued)

model, and generating the multimedia content result as a summarization for the multimedia content item using one or more outputs from the GMT model.

20 Claims, 10 Drawing Sheets

(51) Int. Cl.

| | |
|---|---|
| *H04N 21/258* | (2011.01) |
| *H04N 21/8549* | (2011.01) |
| *G06V 10/776* | (2022.01) |
| *G06V 10/82* | (2022.01) |

(52) U.S. Cl.
CPC ... *H04N 21/25891* (2013.01); *H04N 21/8549* (2013.01); *G06V 10/776* (2022.01); *G06V 10/82* (2022.01)

(58) Field of Classification Search
USPC ........................................................ 386/278
See application file for complete search history.

(56) References Cited

U.S. PATENT DOCUMENTS

| | | | | |
|---|---|---|---|---|
| 11,694,726 | B2 * | 7/2023 | Liu ..................... | H04N 21/845 |
| | | | | 725/14 |
| 11,756,301 | B2 * | 9/2023 | Jain ..................... | G06V 10/761 |
| | | | | 382/165 |
| 11,797,780 | B1 | 10/2023 | Finegan et al. | |
| 11,908,180 | B1 | 2/2024 | Ho et al. | |
| 11,941,885 | B2 * | 3/2024 | Balannik ............ | G06V 10/7747 |
| 2019/0325084 | A1 | 10/2019 | Peng et al. | |
| 2022/0230061 | A1 | 7/2022 | Singh et al. | |
| 2022/0245424 | A1 | 8/2022 | Goyal et al. | |
| 2023/0118966 | A1 | 4/2023 | Liu et al. | |
| 2023/0154146 | A1 | 5/2023 | Li et al. | |
| 2023/0370696 | A1 | 11/2023 | Sundar et al. | |
| 2024/0062545 | A1 * | 2/2024 | Nabeto ..................... | H04N 5/91 |
| 2025/0063136 | A1 * | 2/2025 | Palczewski ............... | G06T 5/77 |
| 2025/0119624 | A1 * | 4/2025 | Oh ..................... | H04N 21/816 |
| 2025/0203130 | A1 * | 6/2025 | Davis .............. | H04N 21/44226 |

FOREIGN PATENT DOCUMENTS

| | | |
|---|---|---|
| KR | 10-2247532 B1 | 5/2021 |
| KR | 10-2022-0129443 A | 9/2022 |

* cited by examiner

800

802

Create prompt text based on one or more user preferences

804

Generate image frames based on the prompt text

806

Compile the image frames into a multimedia content result

808

Display the multimedia content result on a display

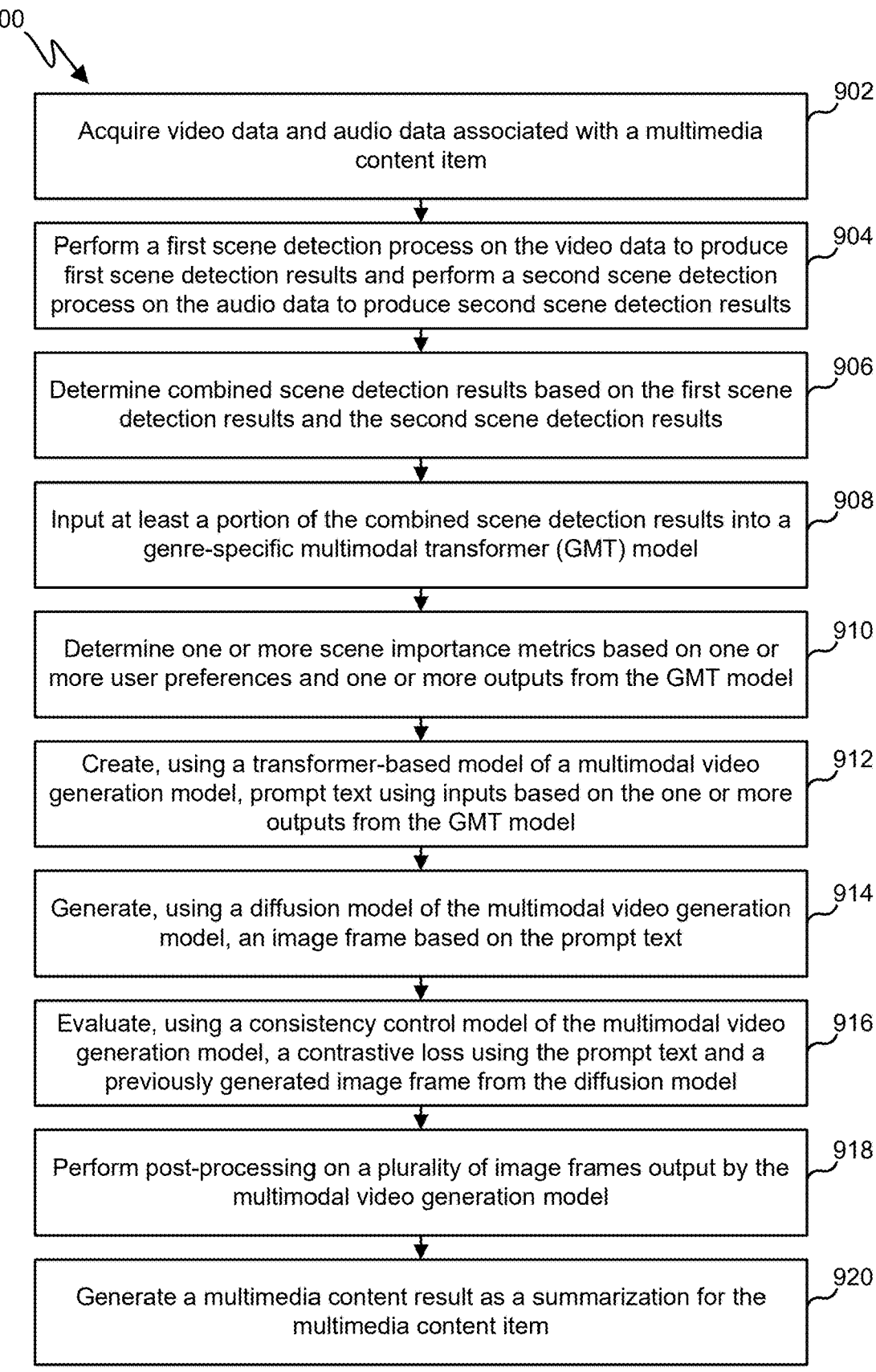

900

Acquire video data and audio data associated with a multimedia content item    902

Perform a first scene detection process on the video data to produce first scene detection results and perform a second scene detection process on the audio data to produce second scene detection results    904

Determine combined scene detection results based on the first scene detection results and the second scene detection results    906

Input at least a portion of the combined scene detection results into a genre-specific multimodal transformer (GMT) model    908

Determine one or more scene importance metrics based on one or more user preferences and one or more outputs from the GMT model    910

Create, using a transformer-based model of a multimodal video generation model, prompt text using inputs based on the one or more outputs from the GMT model    912

Generate, using a diffusion model of the multimodal video generation model, an image frame based on the prompt text    914

Evaluate, using a consistency control model of the multimodal video generation model, a contrastive loss using the prompt text and a previously generated image frame from the diffusion model    916

Perform post-processing on a plurality of image frames output by the multimodal video generation model    918

Generate a multimedia content result as a summarization for the multimedia content item    920

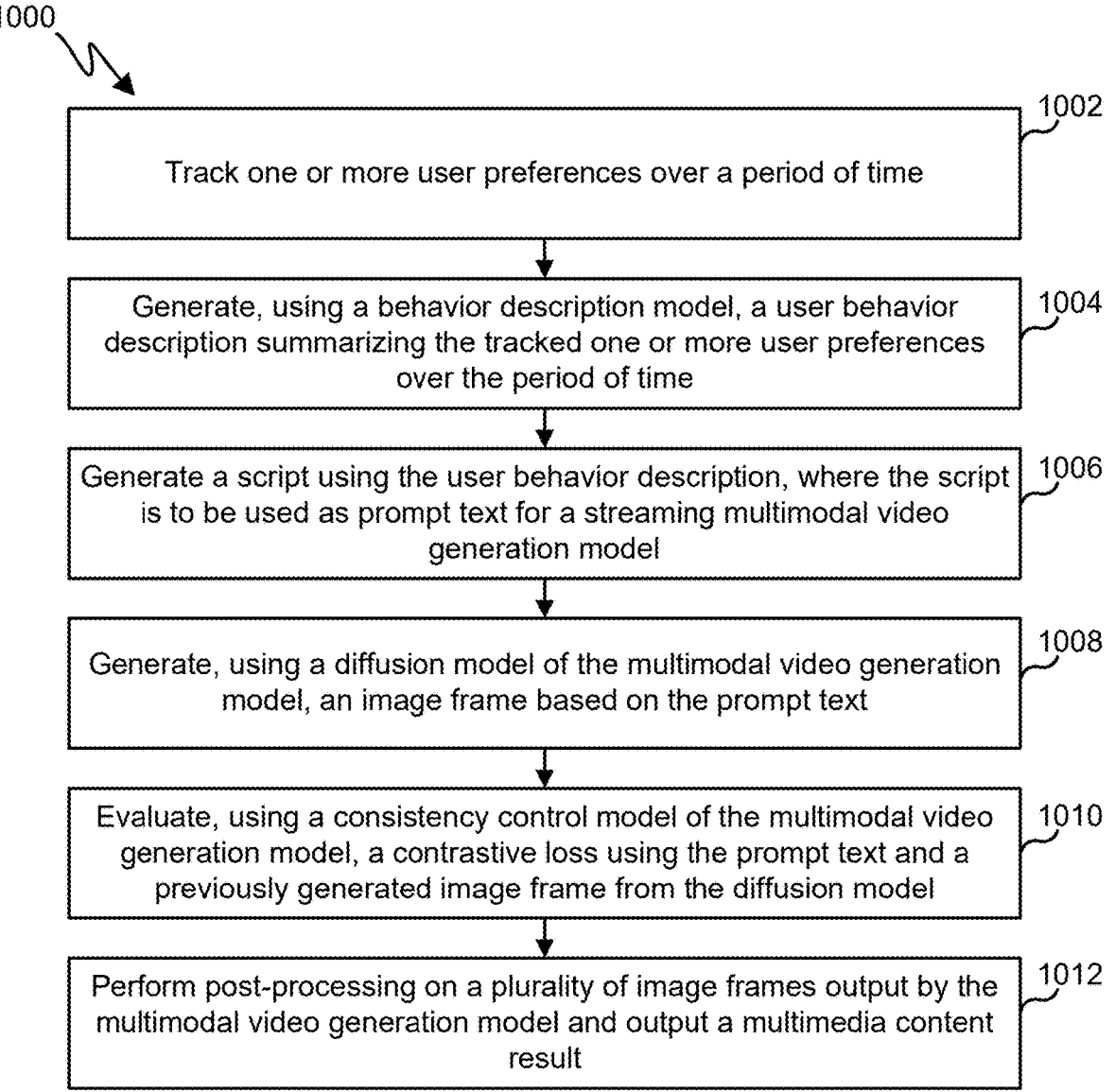

1002

Track one or more user preferences over a period of time

1004

Generate, using a behavior description model, a user behavior description summarizing the tracked one or more user preferences over the period of time

1006

Generate a script using the user behavior description, where the script is to be used as prompt text for a streaming multimodal video generation model

1008

Generate, using a diffusion model of the multimodal video generation model, an image frame based on the prompt text

1010

Evaluate, using a consistency control model of the multimodal video generation model, a contrastive loss using the prompt text and a previously generated image frame from the diffusion model

1012

Perform post-processing on a plurality of image frames output by the multimodal video generation model and output a multimedia content result

FIGURE 10

PERSONALIZED GENERATIVE VIDEO SUMMARIZATION

CROSS-REFERENCE TO RELATED APPLICATION AND PRIORITY CLAIM

This application claims priority under 35 U.S.C. § 119(e) to U.S. Provisional Patent Application No. 63/561,254 filed on Mar. 4, 2024, which is hereby incorporated by reference in its entirety.

TECHNICAL FIELD

This disclosure relates generally to machine learning systems. More specifically, this disclosure relates to personalized generative video summarization.

BACKGROUND

Streaming television has become popular for users to consume linear television video content. However, users increasingly have less time to watch long-form video content, leading to the rise in short-form video content and services. There is, therefore, a need to provide users with a way to consume television content in a short-form format.

SUMMARY

This disclosure relates to personalized generative video summarization.

In one example, a method includes generating a multimedia content result using a streaming multimodal video generation model. Generating a multimedia content result using a streaming multimodal video generation model includes creating prompt text based on one or more user preferences, generating image frames based on the prompt text, compiling the image frames into the multimedia content result, and displaying the multimedia content result on a display.

In some examples, the method also includes acquiring video data and audio data associated with a multimedia content item, performing a first scene detection process on the video data to produce first scene detection results, performing a second scene detection process on the audio data to produce second scene detection results, determining combined scene detection results based on the first scene detection results and the second scene detection results, inputting at least a portion of the combined scene detection results into a genre-specific multimodal transformer (GMT) model, and generating the multimedia content result as a summarization for the multimedia content item using one or more outputs from the GMT model.

In another example, an electronic device includes at least one processing device configured to generate a multimedia content result using a streaming multimodal video generation model. The at least one processing device is further configured to create prompt text based on one or more user preferences. The at least one processing device is further configured to generate image frames based on the prompt text. The at least one processing device is further configured to compile the image frames into the multimedia content result. The at least one processing device is further configured to display the multimedia content result on a display.

In some examples, the at least one processing device is further configured to acquire video data and audio data associated with a multimedia content item, perform a first scene detection process on the video data to produce first scene detection results, perform a second scene detection process on the audio data to produce second scene detection results, determine combined scene detection results based on the first scene detection results and the second scene detection results, input at least a portion of the combined scene detection results into a genre-specific multimodal transformer (GMT) model, and generate the multimedia content result as a summarization for the multimedia content item using one or more outputs from the GMT model.

In another example, a non-transitory machine readable medium includes instructions that when executed cause at least one processor of an electronic device to generate a multimedia content result using a streaming multimodal video generation model. The instructions when executed further cause the at least one processing device to create prompt text based on one or more user preferences, generate image frames based on the prompt text, compile the image frames into the multimedia content result, and display the multimedia content result on a display.

In some examples, the instructions when executed further cause the at least one processor of the electronic device to acquire video data and audio data associated with a multimedia content item, perform a first scene detection process on the video data to produce first scene detection results, perform a second scene detection process on the audio data to produce second scene detection results, determine combined scene detection results based on the first scene detection results and the second scene detection results, input at least a portion of the combined scene detection results into a genre-specific multimodal transformer (GMT) model, generate the multimedia content result as a summarization for the multimedia content item using one or more outputs from the GMT model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 9 illustrates an example method for genre-specific multimodal generative multimedia creation in accordance with this disclosure; and FIG. 10 illustrates an example method for generative original multimedia creation in accordance with this disclosure.

DETAILED DESCRIPTION

Figure 1:
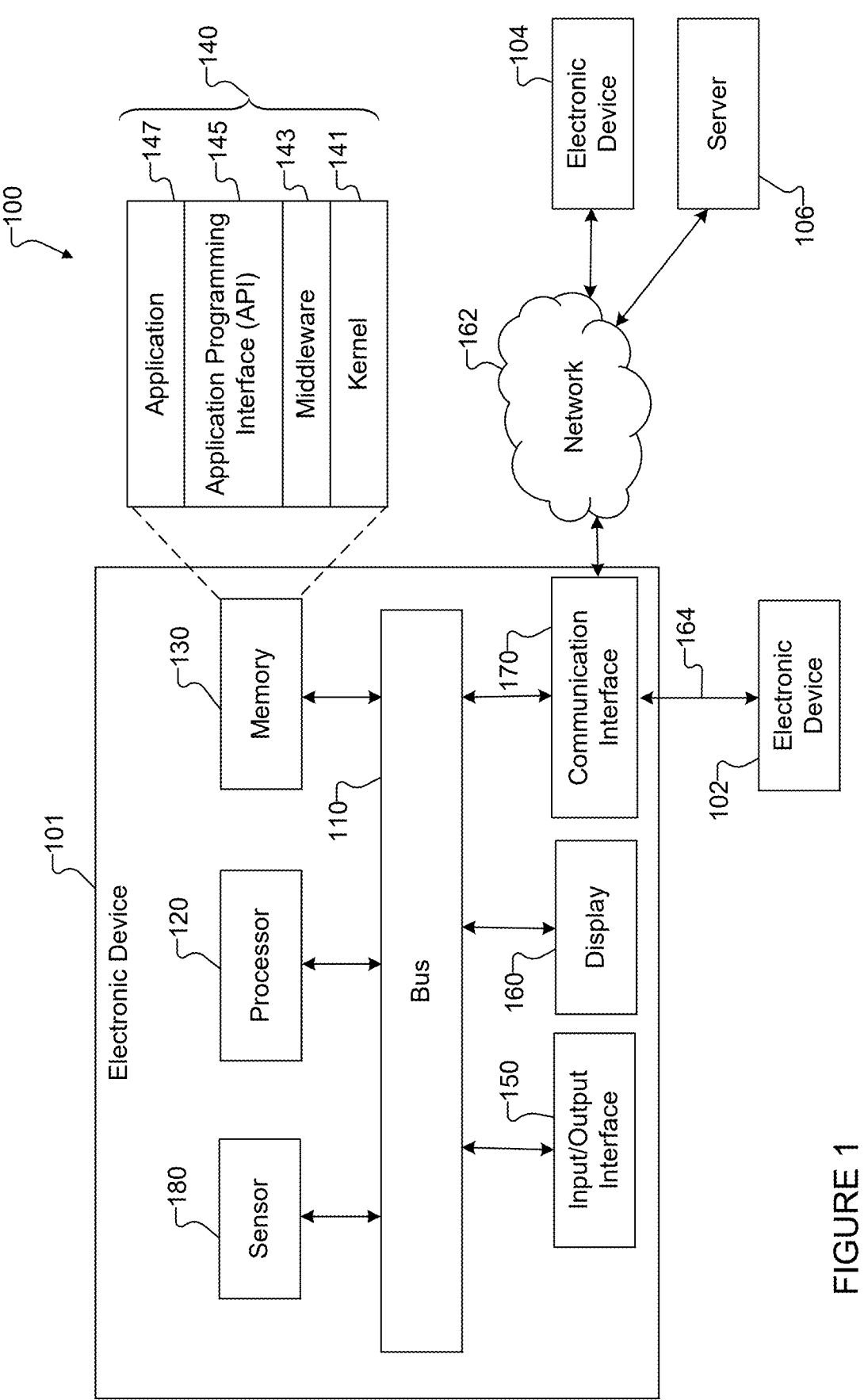
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, streaming television has become popular for users to consume linear television video content. However, users increasingly have less time to watch long-form video content, leading to the rise in short-form video content and services. There is, therefore, a need to provide users with a way to consume television content in a short-form format.

This disclosure provides for personalized generative video summarization systems and methods that utilize the rich video content on television streaming platforms to create short-form content for display on an electronic device. Various embodiments of this disclosure include creating a short-form summary video based on a long-form television (or other video content) program using a genre-specific multimodal transformer (GMT) model and a streaming multimodal video generation model. In some embodiments, the summary video can be used in a current program guide system of the television streaming system to provide a more intuitive guide for users when they try to select a program to watch. That is, the summary video can take the place of, or be displayed along with, a TV guide interface. Various embodiments of this disclosure also allow for creating short-form videos based on user preferences. For example, even without watching the long-form original video content, a user may wish to watch just short-form videos that are generated specially for user by analyzing the user's historical TV watching behavior.

The generative video summarization system of this disclosure thus provides for the creation of user specific summarizations of original television programs to provide an enhanced user experience when searching the television content, and can also enhance the content of the generated video based on user preferences to make the summary video more attractive to a specific user. The various embodiments of this disclosure allow for splitting of original long video into different scenes according to user preference based semantic analysis, generation of a summary video without editing the original video, and maintaining semantic and temporal consistence in the generated summary video. This is accomplished by using the GMT model that is configured to execute scene selection and genre-based semantic analysis at the same time and by using the streaming multimodal video generation model that is configured to create a generative artificial intelligence video according to the original input video at any length.

In various embodiments, the GMT model is configured to perform multimodal position encoding that allows the GMT model to run scene level semantic understanding at the content and temporal levels. In various embodiments, the GMT model is configured to perform self-attention with multimodal alignment that allows the GMT model to execute a comprehensive and cross-domain semantic analysis. In various embodiments, the GMT model is trained using a loss function with a classification loss and a multi-label classification loss that enables the GMT model to run multi-task operations during end-to-end training simultaneously. In various embodiments, a multimodal alignment loss is used to allow the GMT model to improve consistency among different inputs during training.

In various embodiments, the streaming multimodal video generation model includes a transformer-based multimodal stream control model configured to generate prompt text according to frame captioning and closed captioning at time t in the original video, to provide frame level temporal control. In various embodiments, the streaming multimodal video generation model includes a consistency control model that takes the generated frame from time t−1 and the prompt text from time t and utilizes a pre-trained image encoder and pre-trained text encoder to calculate the contrastive loss to control a diffusion model while the diffusion model generates a new frame for the summary video.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices.

Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to personalized generative video summarization.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to personalized generative video summarization. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to personalized generative video summarization.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
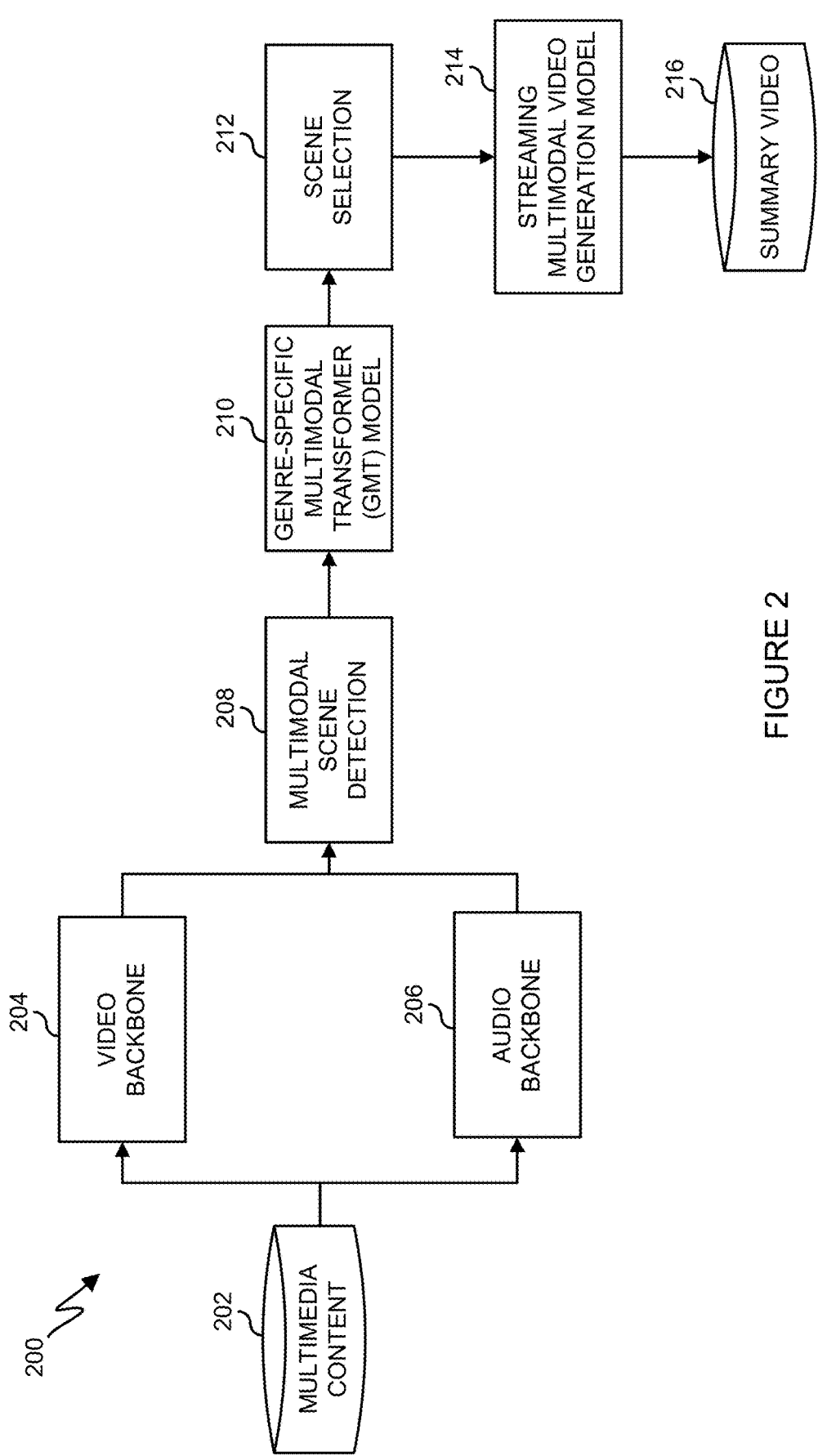
FIG. 2 illustrates an example generative video summarization system architecture in accordance with this disclosure.

FIG. 2 illustrates an example generative video summarization system architecture 200 in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 includes a store of multimedia content 202, including multimedia content items such as one or more television programs. The architecture includes a video backbone 204 and an audio backbone 206. The video of a multimedia content item is processed by the video backbone 204 and the audio of the multimedia content item is processed by the audio backbone 206. In various embodiments, the audio backbone 206 can include an automated speech recognition (ASR) model that converts acoustic information in the audio to text.

Figure 3:
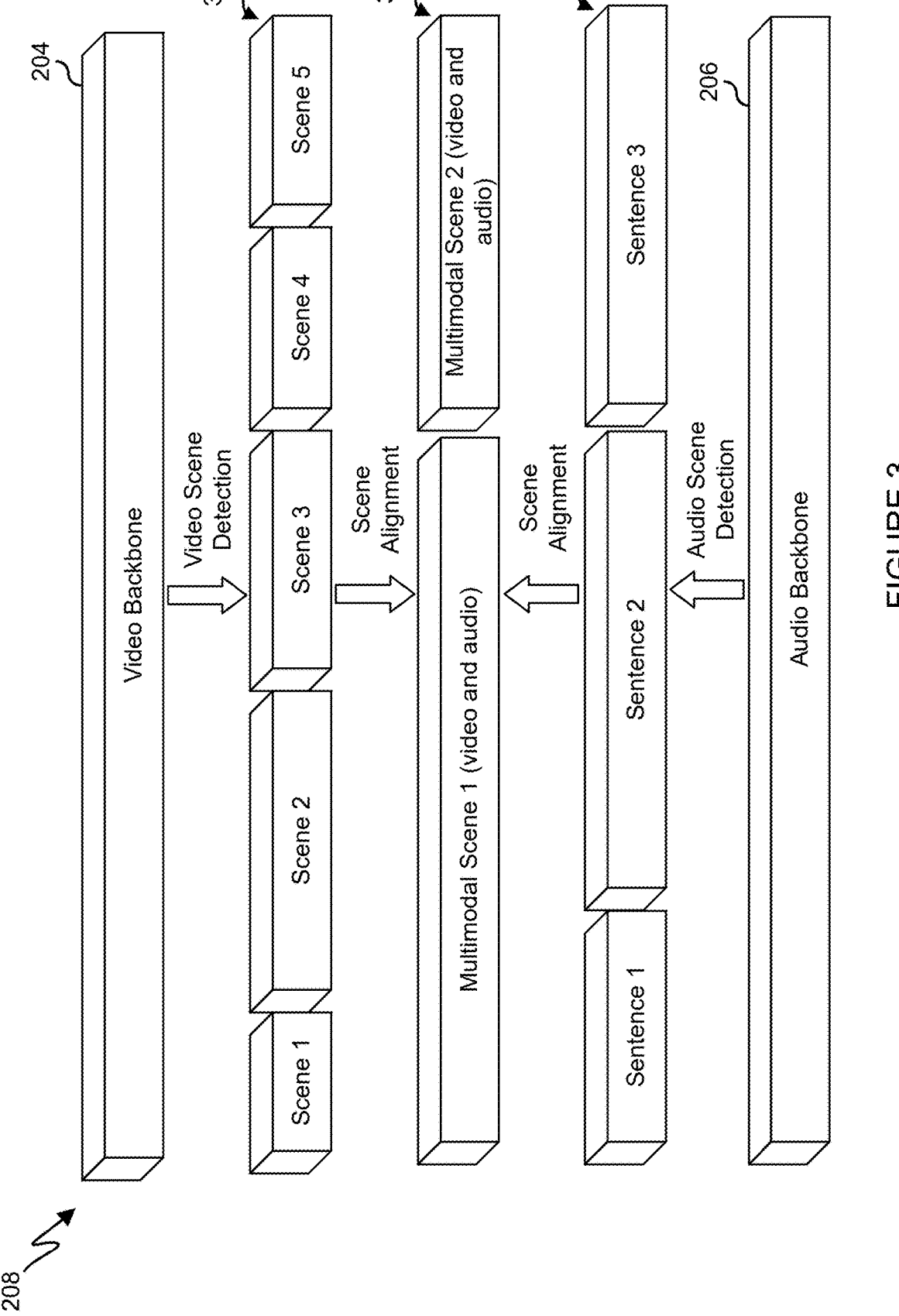
FIG. 3 illustrates the multimodal scene detection operation in accordance with this disclosure.

The architecture 200 also includes a multimodal scene detection operation 208 that is performed by taking both video data from the video backbone 204 and audio data (which can be text data) from the audio backbone 206 and cuts or divides the original video into scenes. For example, FIG. 3 illustrates the multimodal scene detection operation 208 in accordance with this disclosure. For case of explanation, the multimodal scene detection operation 208 shown in FIG. 3 is described as being implemented on or supported by the electronic device 101 in the network configuration 100 of FIG. 1. However, the multimodal scene detection operation 208 shown in FIG. 3 could be used with any other suitable device(s) and in any other suitable system(s), such as when the multimodal scene detection operation 208 is implemented on or supported by the server 106.

As shown in FIG. 3, the multimodal scene detection operation 208 first runs scene detection separately on the video data from the video backbone 204 and the audio data from the audio backbone 206. For instance, as shown in FIG. 3, video scene detection executed on the video data from the video backbone 204 results in the creation of a plurality of video scenes 302, and audio scene detection separately executed on the audio data from the audio backbone 206 results in the creation of a plurality of sentences 304. Scene alignment is then executed by the multimodal scene detection operation 208 to combine the two scene detection results 302, 304 into multimodal scenes 306 that include both video and audio data. The multimodal scene detection operation 208 helps to prevent flickering issues between the video and audio, such as a video scene transitioning to another video scene before a sentence from the audio data is completed, which can result in the sentence being cut off unnaturally and before it is fully presented to the user.

Referring again to FIG. 2, the architecture 200 includes a genre-specific multimodal transformer (GMT) model 210.

As described in this disclosure, outputs from the multimodal scene detection operation 208, such as at least a portion of the combined multimodal scenes, are provided to the GMT model 210 and the GMT model 210 performs scene selection and genre-based semantic analysis simultaneously to perform multimodal position encoding to map video, audio, and genre information to a same latent space, and perform self-attention with multimodal alignment to merge information from different modalities.

The architecture 200 also includes a scene selection model 212 that receives outputs from the GMT model 210, such as outputs including scene importance scores and semantic analysis results, and selects scenes for a specific user according to this user's personal preferences. As described in this disclosure, the architecture 200 further includes a streaming multimodal video generation model 214 that is used to generate a summary video 216 based on the scenes selected by the scene selection model 212. The streaming multimodal video generation model 214 provides temporal and semantic consistence during video generation.

The architecture 200 can achieve genre-specific video summarization gains across multiple genres compared to other architectures. For example, even with a varying number of genres and varying video length, the GMT model 210 can outperform other baseline architectures and can provide consistent results even when the number of genres increases. Because the GMT model 210 can utilize multimodal scene detection information which considers both scene and sentence completeness in the scene segmentation, the GMT model 210 provides improved multimodal understanding and an improved user experience.

Although FIG. 2 illustrates one example of a generative video summarization system architecture 200, various changes may be made to FIG. 2. For example, various components and functions in FIG. 2 may be combined, further subdivided, replicated, or rearranged according to particular needs. Also, one or more additional components and functions may be included if needed or desired.

Although FIG. 3 illustrates one example of a multimodal scene detection operation 208, various changes may be made to FIG. 3. For example, various components and functions in FIG. 3 may be combined, further subdivided, replicated, or rearranged according to particular needs. Also, one or more additional components and functions may be included if needed or desired.

Figure 4:
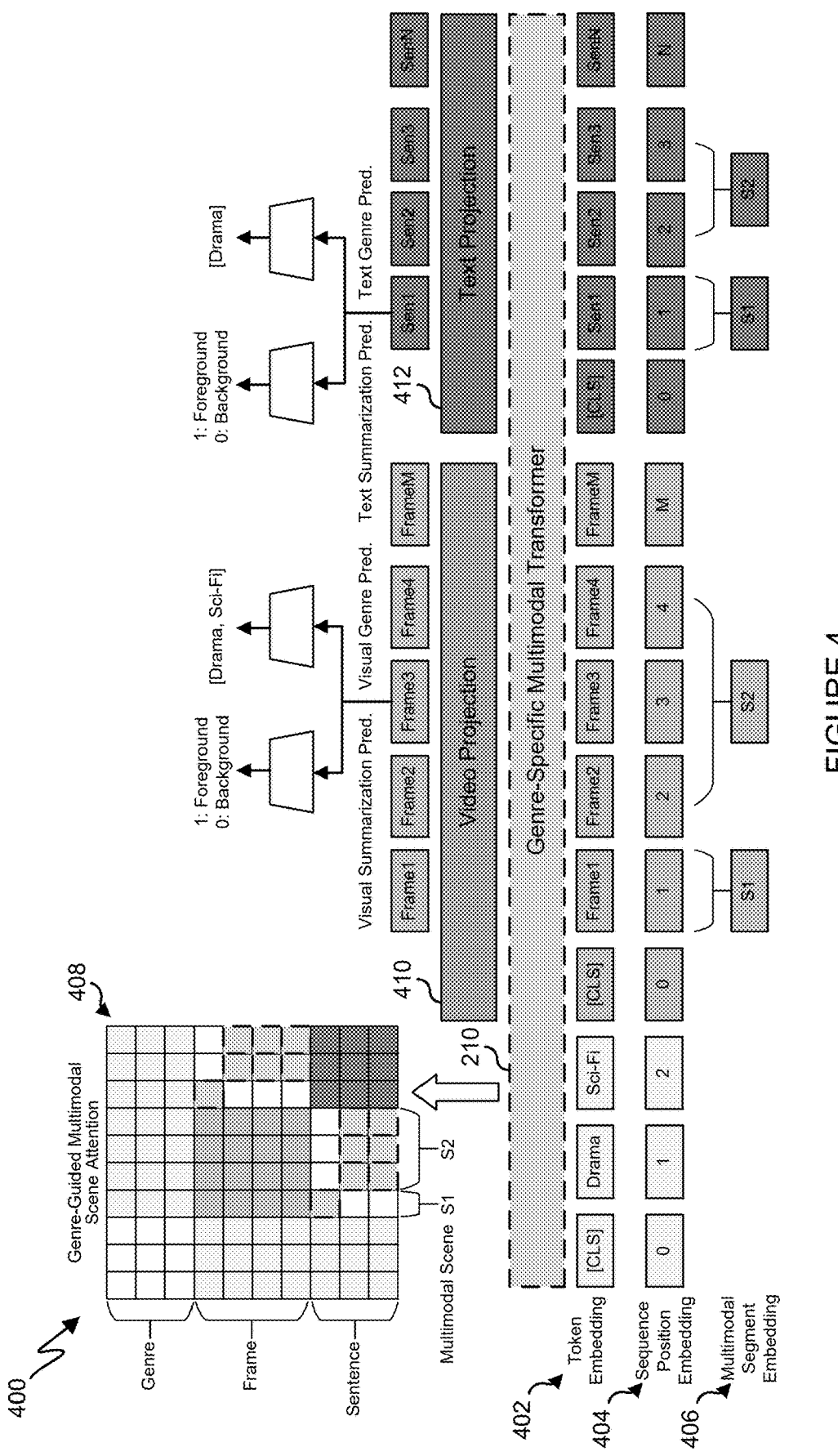
FIG. 4 illustrates an example multimodal semantic alignment and analysis process in accordance with this disclosure.

FIG. 4 illustrates an example multimodal semantic alignment and analysis process 400 in accordance with this disclosure. For case of explanation, the process 400 is described as involving the use of the electronic device 101 in the network configuration 100 of FIG. 1. However, the process 400 may be used with any other suitable electronic device (such as the server 106) or a combination of devices (such as the electronic device 101 and the server 106) and in any other suitable system(s).

As shown in FIG. 4, the multimodal semantic alignment and analysis process 400 includes that utilizes a multimodal semantic automatic alignment network and the GMT model 210 that takes as inputs both the video and ASR text features as well as genre features. As shown in FIG. 4, the video, audio text, and genre inputs each have their feature or token embedding 402, sequence position embedding 404, and multimodal segment embedding 406 to map them into the same latency space. This multimodal position embedding is used to keep the completeness of both video and audio to prevent flicker issues in the final summary video output.

As also shown in FIG. 4, the token embedding 402 includes tokens for the genre information, the video frames, and the audio text sentences. For example, as shown in FIG. 4, the genre information can include classification tokens denoted and starting with a classification tag ([CLS]) following by genre information pertaining to the genre of scenes in the video. The video frames and audio text sentences are also indicated in the token embedding 402. The scenes, as determined for example using the multimodal scene detection operation 208, are included in the multimodal segment embedding 406 and are aligned with the different sequence position embeddings 404 and are also aligned with the frames and audio text sentences in the token embeddings 402 that are associated with the particular scene. For instance, as shown in FIG. 4, scene 1 includes the first frame of the video and the first sentence of the audio text, and scene 1 is tagged as being in the "drama" genre. Scene 2 in the example of FIG. 4 includes the second, third, and fourth frames of the video and the second and third sentences of the audio text, and scene 2 is tagged as being in the "Sci-Fi" genre.

As illustrated in FIG. 4, there can be any number of token embeddings 402, sequence position embeddings 404, and multimodal segment embeddings 406, such as depending on the length of the original input video.

The GMT model 210 utilizes an alignment-guided self-attention structure that is used to run semantic analysis and scene alignment for the input video to create a genre-guided multimodal scene attention matrix 408 that functions like a map to align the genres, frames, and scenes in the inputs. Multi-task prediction follows the alignment-guided self-attention structure to predict the cut position for scenes in original video and the corresponding genre for each scene. As illustrated in FIG. 4, the dashed line parts of the matrix 408 indicate a "1" and the other parts indicate a "0" for the values in the matrix 408.

In various embodiments, because user preferences for systems like automatic content recognition (ACR) systems are typically genre-based, the aim of GMT model 210 is to recognize the most important scenes in a given video by considering the input genres that reflect the user's preferences. As shown in FIG. 4, the GMT model 210 takes in multiple modalities (e.g., video and closed caption sentences) comprising M video frames and N sentences. As described above, multimodal scene detection is initially conducted, and each video frame and sentence are assigned to a specific scene along with its corresponding start and end times. The overall architecture can be structured as three components: input embedding, multimodal alignment and fusion, and a loss function.

For the model input, given an untrimmed video V, it includes M frames with their corresponding visual features $f_i$ (i=1, 2, . . . . M) and N sentences with their text features $s_j$ (j=1, 2, . . . . N), along with the user-preferred genre $g_l$ (l=1, 2, . . . . U). The multimodal position encoding shown in FIG. 4 is trainable and used during the input phase. Each frame and sentence correspond to one of the K scenes denoted as $s_k$ (k=1, 2, . . . . K). It will be understood that a scene may encompass multiple frames f and sentences s that share similar semantics (e.g., genre). After incorporating these positional embeddings for frames and sentences, the final input sequences, comprising genres, frames, and sentences, are concatenated, which can be denoted as $X \in R^{(U+M+N) \times C}$.

As also indicated above, the alignment-guided self-attention mechanism to merge information from different modalities is utilized through a masked self-attention operation with a corresponding mask $A \in R^{(U+M+N) \times (U+M+N)}$. This modeling within the same modality enabling features to focus on one another, resulting in all entries related to intra-modality attention being assigned a value of 1 in the attention mask. Concerning the cross-modality attention between video and textual inputs, only entries linked to the same multimodal segment are marked with "1". In contrast to previous methods that establish cross-modality attention based on frame and closed caption co-occurrence, the process 400 determines cross-modality attention based on the multimodal scene detection. The frames and sentences are conditioned on the input genres, the attention is set to 1, and the attention mask is utilized on the attention matrix computed using a self-attention process, which can be represented as follows.

$$Q = XW_Q, K = XW_K, V = XW_V,$$

$$D_{i,j} = \frac{A_{i,j}\exp\left(Q_i K_j^T/\sqrt{D}\right)}{\sum_k A_{i,k}\exp\left(Q_i K_k^T/\sqrt{D}\right)},$$

$$Z = X + DVW_o$$

Here, i and j ranging from 1 to U+M+N represent the indices of entries in the matrix. X refers to the input features that include genre, frames, and sentences. The matrices $W_Q$, $W_K$, $W_V$, and $W_O$ of size $R^{C \times C}$ are utilized for projecting queries, keys, values, and generating outputs. This allows for explicitly exploiting the alignment relationships between genre, video and text in multimodal scene detection, resulting in improved alignment between modalities.

As further shown in FIG. 4, a video projection operation 410 and a text projection operation 412 of the GMT model 210 are used to output the labels for each video frame and audio sentence between 1 (foreground) and 0 (background) based on the genre for the particular video frame or audio sentence. These labels are used to provide an importance score for each scene in the original video content.

A loss function can be used to train the GMT model 210 that incorporates a classification loss, a multi-label classification loss, and a multimodal alignment loss. For the classification loss, focal loss for the classification of importance scores is employed, which addresses problems of imbalanced classes by decreasing the loss for correctly classified samples. The classification loss can be represented as follows.

$$\mathcal{L}_{cls_m} = -\begin{cases} -\alpha(1-p)^\gamma \log(p), & \text{if } y = 1 \\ -(1-\alpha)p^\gamma \log(1-p), & \text{if } y = 0 \end{cases}$$

$$\mathcal{L}_{cls} = \mathcal{L}_{cls_{video}} + \mathcal{L}_{cls_{text}}$$

Here, m represents the modality, p represents the predicted score for each frame/sentence and y denotes the true label, which can be 0 or 1 as it denotes foreground/background. The overall classification loss is the cumulative sum of the losses for each modality. The text label is obtained from video summarization labels. The text label y=1 signifies that the sentence had a temporal overlap with the final video summarization timeline.

For the multi-label classification loss, genre prediction is conducted for each visual and textual token. The genre label can be single or multiple in this context. To address this, Binary Cross Entropy (BCE) loss can be employed for prediction. In the case of K labels (genres), the network independently predicts the logits for the i-th label, where $p_i$ represents the predicted score for each frame or sentence. Let $y_i$ indicate the label for the i-th class, such that the multi-label classification loss can be represented as follows.

$$\mathcal{L}_{mul_m} = -\frac{1}{K}\begin{cases} -\log(p_i), & \text{if } y_i = 1 \\ -\log(1 - p_i), & \text{if } y_i = 0 \end{cases}$$

$$\mathcal{L}_{mul} = \mathcal{L}_{mul_{video}} + \mathcal{L}_{mul_{text}}$$

The multimodal alignment loss is used to achieve accurate summarization that maintains consistency between visual scenes and complete sentences, where the method guides the prediction process to ensure alignment between visual and textual elements. Like contrastive loss, cosine similarity between tokens in the visual and textual domains is leveraged to bring positive pairs closer together while pushing negative pairs apart. Positive pairs are determined by ground truth aligned visual-text pairs that correspond to the same multimodal scene detection outcome. In the matrix 408 ($M \in R^{M \times N}$), $M_{ij}=1$ if frame $f_i$ and sentence $s_j$ are part of the same multimodal scene. Ultimately, the model is trained to make more aligned predictions within an untrimmed video V. The multimodal alignment loss function $\mathcal{L}_{align}$ can be represented as follows.

$$\mathcal{L}_{align} = \sum_{i=1}^{M} \log \frac{\sum_{M_{ik}=1}^{N_k=1} e^{f_i \cdot s_k - \delta}}{\sum_{M_{ik}=1}^{N_k=1} e^{f_i \cdot s_k - \delta} + \sum_{M_{ik}\neq 1}^{N_k=1} e^{f_i \cdot s_k^{imp}}} +$$

$$\sum_{j=1}^{N} \log \frac{\sum_{M_{ij}=1}^{M_l=1} e^{f_i \cdot s_j - \delta}}{\sum_{M_{ij}=1}^{M_l=1} e^{f_i \cdot s_j - \delta} + \sum_{M_{ij}\neq 1}^{M_l=1} e^{f_i^{imp} \cdot s_j}}$$

Here, $$f_i^{imp}$$

and $$s_k^{imp}$$

denote imposter pairs from the two modalities, sampled from the same video but not belonging to the same multimodal scene. The multimodal alignment loss function aims to distinguish between genuine positive embedding pairs and imposter negative pairs within each video V. By separating positive and negative samples, the spaces of positive and negative samples are enumerated independently. In one scenario, text samples that are in the same scene are paired with various negative video samples, while in the other, video samples that are in the same scene are paired with various negative text samples. The hyperparameter 8 serves as a margin and is chosen empirically.

The final GMT model 210 is trained to minimize the sum of the classification, multi-label classification, and multi-modal alignment losses, which can be represented as follows.

$$\mathcal{L} = \mathcal{L}_{cls} + \lambda_1 \mathcal{L}_{mul} + \lambda_2 \mathcal{L}_{align}$$

Here, $\lambda_1$ and $\lambda_1$ are hyperparameters.

The GMT model 210 outputs scene importance scores $S_{importance}$ and predicted genres $G_p$. The scene selection model 212 described with respect to FIG. 2 takes the outputs from the GMT model 210 and uses the outputs to select the scenes to that will be used to create the final summarization video. The scene selection model 212 calculates a final user-specific scene score S using a function that uses the scene importance score summed with a similarity of the predicted genre $G_p$ for the scene output by the GMT model 210 and a known user genre preference $G_u$, which can be represented as follows.

$$S = S_{importance} + \text{Similarity}(G_p + G_u)$$

Again, here, $S_{importance}$ is the scene importance score from the GMT model 210, $G_p$ is the predicted genre from the GMT model 210 and $G_u$ is the user preference (genre-based). A T5 text encoder can be used here to run embeddings for $G_p$ and $G_u$, and cosine similarity can be used to calculate the similarity score between them.

When scene score is calculated, the top N scenes are selected for use in creating the final summarization video. N is according to the length of the summarization video (e.g., a parameter can be set such that the summarization video is particular length, such as a parameter indicating the summarization video length should be 15% length of original video). The length can be adjustable in the pipeline.

Although FIG. 4 illustrates one example of a multimodal semantic alignment and analysis process 400, various changes may be made to FIG. 4. For example, various components and functions in FIG. 4 may be combined, further subdivided, replicated, or rearranged according to particular needs. Also, one or more additional components and functions may be included if needed or desired. It will be understood that the number of and types of genres, video frames, and audio sentences shown in FIG. 4 can vary based on the original input video.

Figure 5:
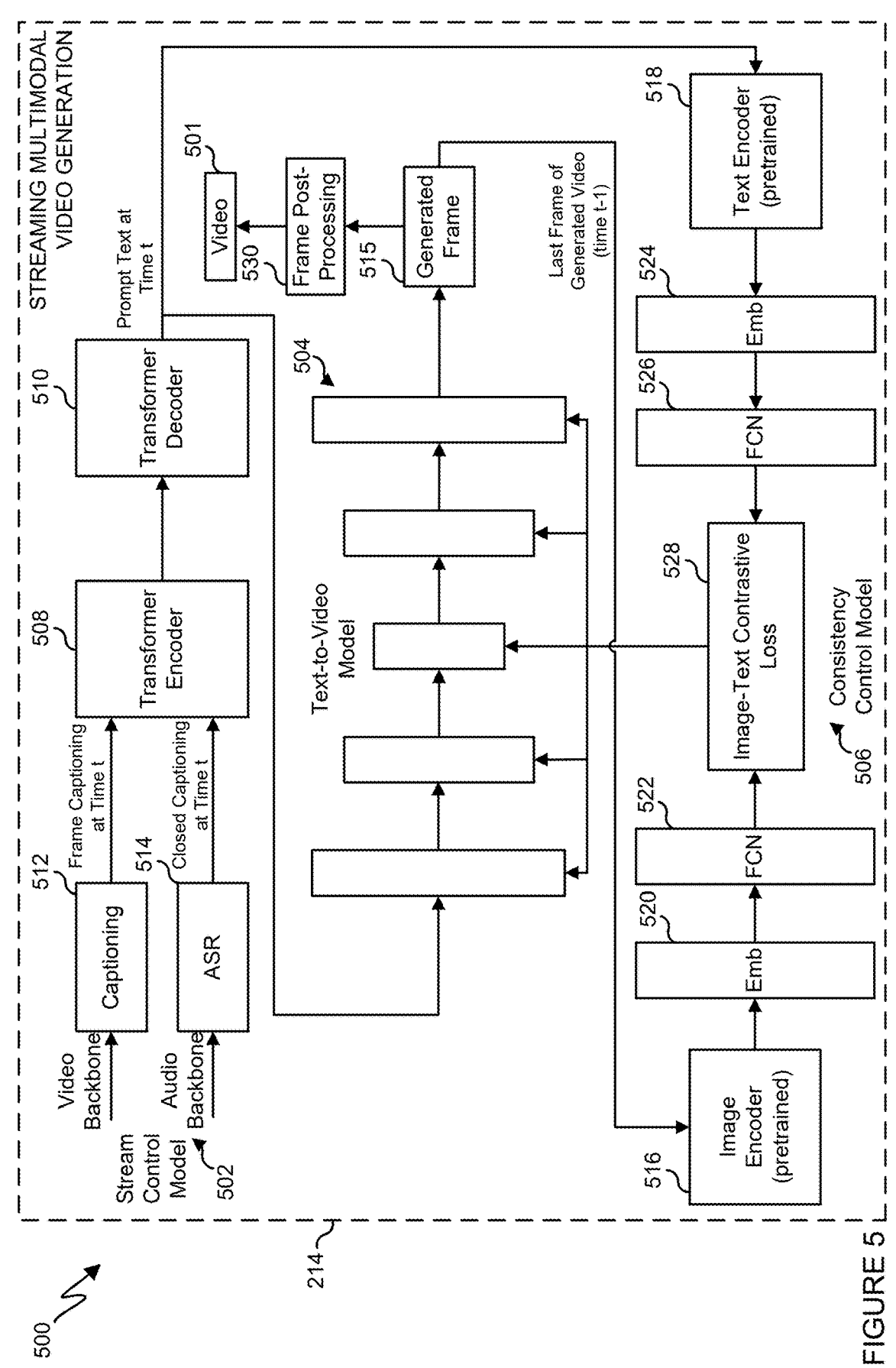
FIG. 5 illustrates an example multimodal video generation process in accordance with this disclosure.

FIG. 5 illustrates an example multimodal video generation process 500 in accordance with this disclosure. For ease of explanation, the process 500 is described as involving the use of the electronic device 101 in the network configuration 100 of FIG. 1. However, the process 500 may be used with any other suitable electronic device (such as the server 106) or a combination of devices (such as the electronic device 101 and the server 106) and in any other suitable system(s).

As shown in FIG. 5, the process 500 uses the streaming multimodal video generation model 214, also described with respect to FIG. 2, to generate a summary final multimedia content result 501, e.g., a summarization video. The streaming multimodal video generation model 214 includes a transformer-based multimodal stream control model 502, a text-to-video model 504 (e.g., a diffusion model), and a consistency control model 506.

The transformer-based multimodal stream control model 502 generates prompt text using a transformer encoder 508 and a transformer decoder 510 according to frame captioning 512 and closed captioning 514 at time t of the original input video and using the top N scenes selected for use in creating the final summarization video by the scene selection model 212. The transformer-based multimodal stream control model 502 provides frame level temporal control to the streaming multimodal video generation model 214.

The text-to-video model 504 receives the prompt text at time t and generates an image frame 515 at time t according to each prompt text received. The consistency control model 506 includes a pretrained image encoder 516 and a pretrained text encoder 518. The pretrained image encoder 516 takes as input the generated frame from time t−1 and the pretrained text encoder 518 takes as input the prompt text from time t. As shown in FIG. 5, the output from the image encoder 516 is processed through an embedding layer 520 and a fully connected network (FCN) layer 522. Likewise, the output from the text encoder 518 is processed through an embedding layer 524 and an FCN layer 526. The consistency control model 506 utilizes the outputs from the FCNs 522, 526 to calculate an image-text contrastive loss 528. As shown in FIG. 5, the image-text contrastive loss 528 is used to control the text-to-video model 504 while it is generating a next new frame. A frame post-processing operation 530 is then performed on the generated frames 515 to construct the final video 501. The resulting final video 501 thus includes a series of completely AI-generated images, i.e., although the final video 501 is based on the original input video, the images are not from the original input video, but are AI-generated based on the prompt text.

Although FIG. 5 illustrates one example of a multimodal video generation process 500, various changes may be made to FIG. 5. For example, various components and functions in FIG. 5 may be combined, further subdivided, replicated, or rearranged according to particular needs. Also, one or more additional components and functions may be included if needed or desired.

Figure 6:
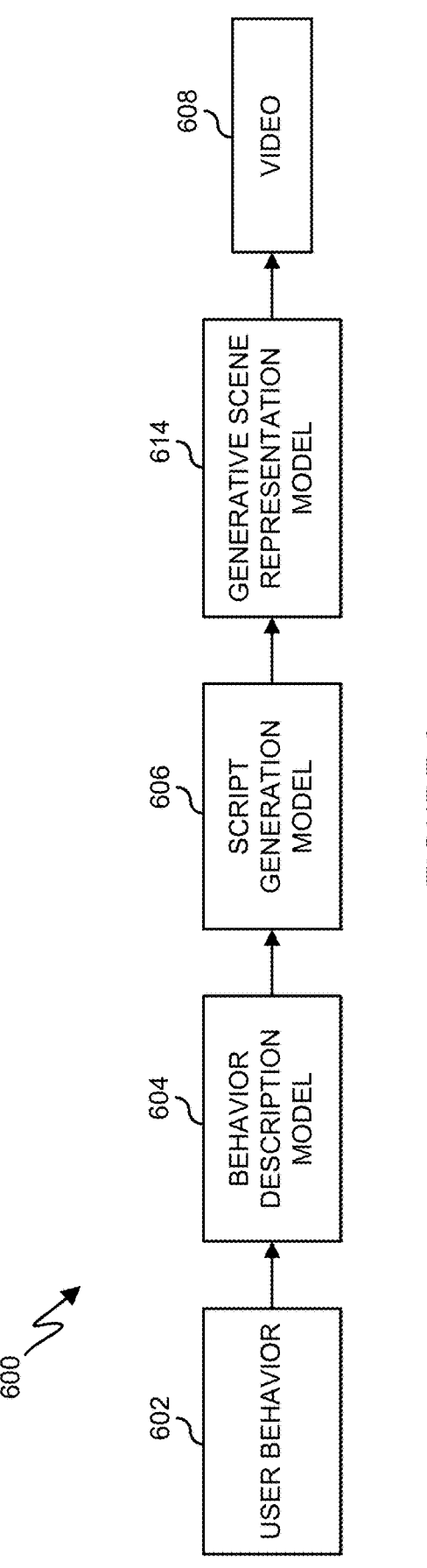
FIG. 6 illustrates an example generative scene representation creation process in accordance with this disclosure.

In some embodiments of this disclosure, using a variation of the streaming multimodal video generation model 214, it can also be possible to not just create user specific generative summary videos for television programs, but to also create original content. FIG. 6 illustrates an example generative scene representation creation process 600 in accordance with this disclosure. For case of explanation, the process 600 is described as involving the use of the electronic device 101 in the network configuration 100 of FIG. 1. However, the process 600 may be used with any other suitable electronic device (such as the server 106) or a combination of devices (such as the electronic device 101 and the server 106) and in any other suitable system(s).

The process 600 includes tracking user behavior 602, such as user TV-watching behavior over a particular time period. A behavior description model 604 summarizes the user behavior 602, such as constructing a summary description in one or more paragraphs. A script generation model 606 then transforms the summary description into script, e.g., a movie script. A generative scene representation model 614 uses the script as prompt text to generate a video 608, such as a short movie based on the movie script, to provide for display a user's own preference-based video. In this way, original content can be created based on the user's preferences and without needing to use an original video input. For example, if the user's behavior includes watching both comedies and science fiction shows on television, a movie script can be created that includes a character from a science fiction show the user watches performing comedic acts.

Although FIG. 6 illustrates one example of a generative scene representation creation process 600, various changes may be made to FIG. 6. For example, various components and functions in FIG. 6 may be combined, further subdivided, replicated, or rearranged according to particular needs. Also, one or more additional components and functions may be included if needed or desired.

Figure 7:
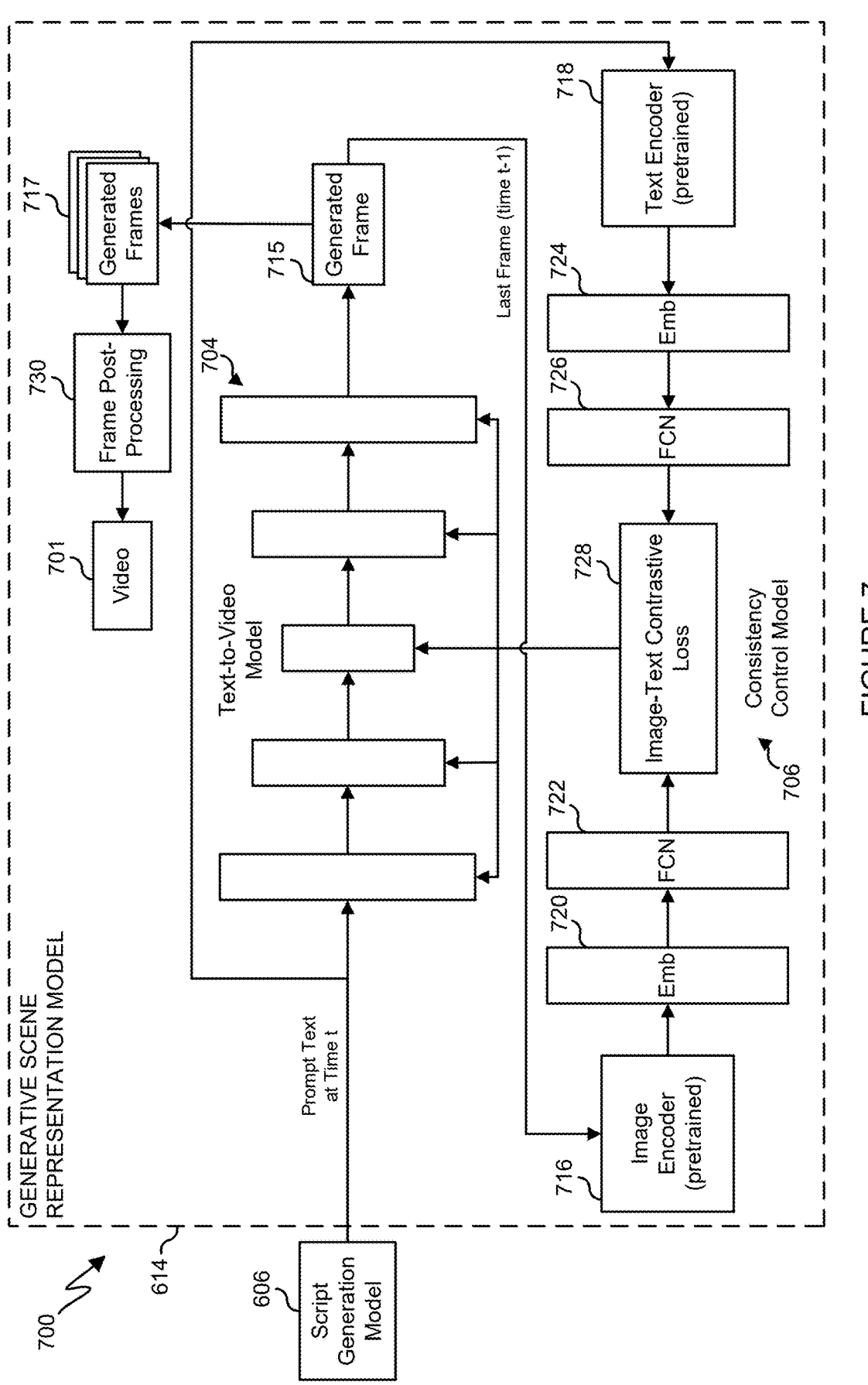
FIG. 7 illustrates an example generative scene representation model process in accordance with this disclosure.

FIG. 7 illustrates an example generative scene representation model process 700 in accordance with this disclosure. For case of explanation, the process 700 is described as involving the use of the electronic device 101 in the network configuration 100 of FIG. 1. However, the process 700 may be used with any other suitable electronic device (such as the server 106) or a combination of devices (such as the electronic device 101 and the server 106) and in any other suitable system(s).

As shown in FIG. 7, the process 700 uses the generative scene representation model 614 described in FIG. 6. As also shown in FIG. 7, the generative scene representation model 614 can be similar to the streaming multimodal video generation model 214, except that, instead of generating prompt text using the stream control model 502, the script generation model 606 is used to create prompt text for the generative scene representation model 614. The generative scene representation model 614 thus includes a text-to-video model 704 (e.g., a diffusion model), and a consistency control model 706.

As shown in FIG. 7, the process 700 includes the script generation model 606 providing prompt text at time t to the generative scene representation model 614. The text-to-video model 704 receives the prompt text at time t and generates an image frame 715 at each time t according to its prompt text/script at that time. The consistency control model 706 includes a pretrained image encoder 716 and a pretrained text encoder 718. The pretrained image encoder 716 takes as input the generated frame from time t−1 and the pretrained text encoder 718 takes as input the prompt text from time t. As shown in FIG. 7, the output from the image encoder 716 is processed through an embedding layer 720 and an FCN layer 722. Likewise, the output from the text encoder 718 is processed through an embedding layer 724 and an FCN layer 726.

The consistency control model 706 utilizes the outputs from the FCNs 722, 726 to calculate an image-text contrastive loss 728. As shown in FIG. 7, the image-text contrastive loss 728 is used to control the text-to-video model 704 while it is generating a next new frame. After all frames have been generated according to script generation, a frame post-processing operation 730 is performed on the generated frames 717 to combine them together to construct the final video 701. The resulting final video 701 thus includes a series of completely AI-generated images, generated based on the script used as the prompt text. The process 700 thus allows for the generation of video content (such as short movies) based on just user behavior, and without relying on videos from other sources.

Although FIG. 7 illustrates one example of a generative scene representation model process 700, various changes may be made to FIG. 7. For example, various components and functions in FIG. 7 may be combined, further subdivided, replicated, or rearranged according to particular needs. Also, one or more additional components and functions may be included if needed or desired.

Figure 8:
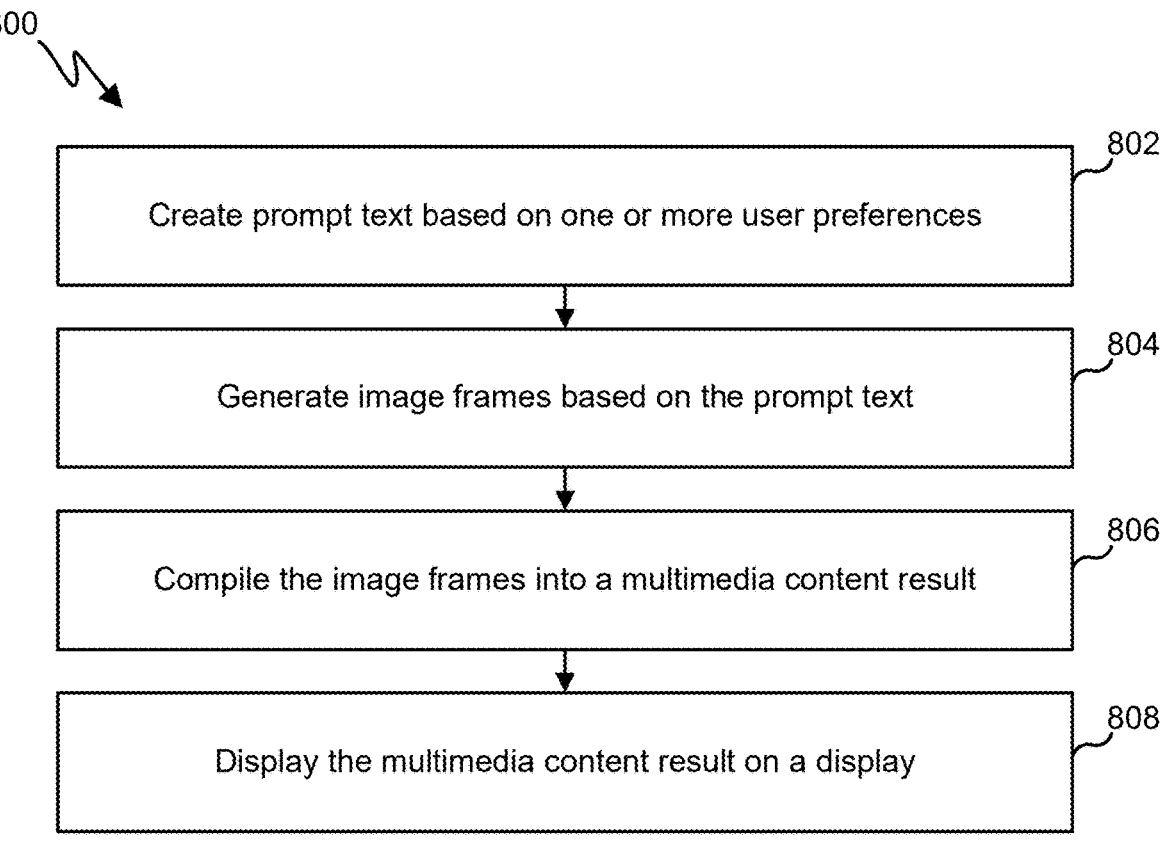
FIG. 8 illustrates an example method for generative multimedia creation in accordance with this disclosure.

FIG. 8 illustrates an example method 800 for generative multimedia creation in accordance with this disclosure. For ease of explanation, the method 800 shown in FIG. 8 is described as being performed using the electronic device

101 in the network configuration 100 of FIG. 1. However, the method 800 could be performed using any other suitable device(s), such as the server 106, and in any other suitable system(s).

At step 802, prompt text is created based on one or more user preferences. In various embodiments, this can include the processor 120 of the electronic device 101 executing the stream control model 502 of the streaming multimodal video generation model 214 to generate prompt text based on one or more outputs from the GMT model 210. In some embodiments, step 802 can include the processor 120 executing using the script generation model 606 to generate the prompt text.

At step 804, image frames are generated based on the prompt text. This can include the processor executing the text-to-video model 504 or 704 and the consistency control model 506 or 706 to generate the image frames. At step 806, the image frames are compiled into a multimedia content result, such as a summarization video or original video content. This can include the processor 120 executing the frame post-processing operation 530 or 730. At step 808, the multimedia content result can be displayed on the electronic device 101 or some other electronic device.

Although FIG. 8 illustrates one example of a method 800 for generative multimedia creation, various changes may be made to FIG. 8. For example, while shown as a series of steps, various steps in FIG. 8 could overlap, occur in parallel, occur in a different order, or occur any number of times (including zero times).

FIG. 9 illustrates an example method 900 for genre-specific multimodal generative multimedia creation in accordance with this disclosure. For case of explanation, the method 900 shown in FIG. 9 is described as being performed using the electronic device 101 in the network configuration 100 of FIG. 1. However, the method 900 could be performed using any other suitable device(s), such as the server 106, and in any other suitable system(s).

At step 902, video data and audio data associated with a multimedia content item are acquired, such as video data and audio data associated with a television program. At step 904, a first scene detection process is performed on the video data to produce first scene detection results, and a second scene detection process is performed on the audio data to produce second scene detection results. At step 906, combined scene detection results are determined based on the first scene detection results and the second scene detection results. Steps 904 and 906 can include the processor 120 of the electronic device 101 executing the multimodal scene detection operation 208.

At step 908, at least a portion of the combined scene detection results is input into a genre-specific multimodal transformer (GMT) model, such as the GMT model 210. This can include the processor 120 executing the GMT model 210 as described in this disclosure, such as to use the GMT model 210 to perform an alignment of the first scene detection results, the second scene detection results, and genre data, including mapping the first scene detection results, the second scene detection results, and the genre data into a same latent space, to perform a self-attention process to merge the first scene detection results, the second scene detection results, and the genre data, and to output genre predictions and importance scores.

At step 910, one or more scene importance metrics are determined based on the one or more user preferences and the one or more outputs from the GMT model. As described in this disclosure, the one or more outputs from the GMT model can include a scene importance score and a predicted genre. Step 910 can include the processor 120 executing the scene selection model 212.

At step 912, a transformer-based model, such as the stream control model 502, is used to create prompt text using inputs based on the one or more outputs from the GMT model. At step 914, a diffusion model is used to generate at least one image frame based on the prompt text. At step 916, a consistency control model is used to evaluate a contrastive loss using the prompt text and a previously generated image frame from the diffusion model. It will be understood that steps 912-916 could be performed any number of times to create any number of video frames.

At step 918, post-processing is performed on the image frames to compile the image frames into a video. This can include the processor 120 executing the frame post-processing operation 530. At step 920, a multimedia content result is generated from the post-processed image frames as a summarization of the multimedia content item.

Although FIG. 9 illustrates one example of a method 900 for genre-specific multimodal generative multimedia creation, various changes may be made to FIG. 9. For example, while shown as a series of steps, various steps in FIG. 9 could overlap, occur in parallel, occur in a different order, or occur any number of times (including zero times).

FIG. 10 illustrates an example method 1000 for generative original multimedia creation in accordance with this disclosure. For case of explanation, the method 1000 shown in FIG. 10 is described as being performed using the electronic device 101 in the network configuration 100 of FIG. 1. However, the method 1000 could be performed using any other suitable device(s), such as the server 106, and in any other suitable system(s).

At step 1002, one or more user preferences are tracked over a period of time, such as television program watching habits of a user like genre of content watched. At step 1004, a user behavior description is generated using a behavior description model, such as the behavior description model 604, summarizing the tracked one or more user preferences over the period of time. This can include the processor 120 of the electronic device 101 executing the behavior description model 604.

At step 1006, a script using the user behavior description is generated where the script is to be used as prompt text for a streaming multimodal video generation model. This can include the processor 120 executing the script generation model 606 and providing the script to the generative scene representation model 614. At step 1008, a diffusion model, such as the text-to-video model 704 of the generative scene representation model 614, is used to receive the script as prompt text and generate at least one image frame based on the prompt text. This can include the processor 120 executing the text-to-video model 704 of the generative scene representation model 614 to generate the image frame.

At step 1010, a consistency control model, such as the consistency control model 706, is used to evaluate a contrastive loss using the prompt text and a previously generated image frame from the diffusion model. It will be understood that steps 1008 and 1010 could be performed any number of times to create any number of video frames.

At step 1012, frame post-processing is performing on a plurality of image frames output by the multimodal video generation model and a multimedia content result is output. This can include the processor 120 executing the frame post-processing operation 730 and combining the image frames into the multimedia content result.

Although FIG. 10 illustrates one example of a method 1000 for generative original multimedia creation, various changes may be made to FIG. 10. For example, while shown as a series of steps, various steps in FIG. 10 could overlap, occur in parallel, occur in a different order, or occur any number of times (including zero times).

It should be noted that the functions shown in FIGS. 2 through 10 or described above can be implemented in an electronic device 101, 102, 104, server 106, or other device (s) in any suitable manner. For example, in some embodiments, at least some of the functions shown in FIGS. 2 through 10 or described above can be implemented or supported using one or more software applications or other software instructions that are executed by the processor 120 of the electronic device 101, 102, 104, server 106, or other device(s). In other embodiments, at least some of the functions shown in FIGS. 2 through 10 or described above can be implemented or supported using dedicated hardware components. In general, the functions shown in FIGS. 2 through 10 or described above can be performed using any suitable hardware or any suitable combination of hardware and software/firmware instructions. Also, the functions shown in FIGS. 2 through 10 or described above can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

generating a multimedia content result using a streaming multimodal video generation model, including:

acquiring video data and audio data associated with a multimedia content item;

performing a first scene detection process on the video data to produce first scene detection results, wherein the first scene detection process divides the video data into separate video scenes;

performing a second scene detection process on the audio data to produce second scene detection results, wherein the second scene detection process divides the audio data into separate audio scenes;

creating prompt text based on one or more user preferences;

generating image frames based on the prompt text; and compiling the image frames into the multimedia content result; and displaying the multimedia content result on a display.

2. The method of claim 1, further comprising:

determining combined scene detection results based on the first scene detection results and the second scene detection results;

inputting at least a portion of the combined scene detection results into a genre-specific multimodal transformer (GMT) model; and generating the multimedia content result as a summarization for the multimedia content item using one or more outputs from the GMT model.

3. The method of claim 2, wherein generating the multimedia content result as the summarization for the multimedia content item includes:

determining one or more scene importance metrics based on the one or more user preferences and the one or more outputs from the GMT model, wherein the one or more outputs of the GMT model include a scene importance score and a predicted genre; and generating the summarization based on the one or more scene importance metrics.

4. The method of claim 3, further comprising:

performing an alignment of the first scene detection results, the second scene detection results, and genre data, including mapping the first scene detection results, the second scene detection results, and the genre data into a same latent space; and performing a self-attention process to merge the first scene detection results, the second scene detection results, and the genre data.

5. The method of claim 4, wherein the streaming multimodal video generation model includes:

a transformer-based model for creating the prompt text using inputs based on the one or more outputs from the GMT model;

a diffusion model for generating an image frame based on the prompt text; and a consistency control model for evaluating a contrastive loss using the prompt text and a previously generated image frame from the diffusion model.

6. The method of claim 1, wherein creating the prompt text includes:

tracking the one or more user preferences over a period of time;

generating, using a behavior description model, a user behavior description summarizing the tracked one or more user preferences over the period of time; and generating a script using the user behavior description.

7. The method of claim 6, wherein the streaming multimodal video generation model includes:

a diffusion model for receiving the script as the prompt text and generating an image frame based on the prompt text;

a consistency control model for evaluating a contrastive loss using the prompt text and a previously generated image frame from the diffusion model; and a frame post-processing model for combining the image frames into the multimedia content result.

8. An electronic device comprising:

at least one processing device configured to:

acquire video data and audio data associated with a multimedia content item;

perform a first scene detection process on the video data to produce first scene detection results, wherein the first scene detection process divides the video data into separate video scenes;

perform a second scene detection process on the audio data to produce second scene detection results, wherein the second scene detection process divides the audio data into separate audio scenes;

generate a multimedia content result using a streaming multimodal video generation model, wherein the at least one processing device is further configured to:

create prompt text based on one or more user preferences;

generate image frames based on the prompt text;

compile the image frames into the multimedia content result; and display the multimedia content result on a display.

9. The electronic device of claim 8, wherein the at least one processing device is further configured to:

determine combined scene detection results based on the first scene detection results and the second scene detection results;

input at least a portion of the combined scene detection results into a genre-specific multimodal transformer (GMT) model; and generate the multimedia content result as a summarization for the multimedia content item using one or more outputs from the GMT model.

10. The electronic device of claim 9, wherein, to generate the multimedia content result as the summarization for the multimedia content item, the at least one processing device is further configured to:

determine one or more scene importance metrics based on the one or more user preferences and the one or more outputs from the GMT model, wherein the one or more outputs of the GMT model include a scene importance score and a predicted genre; and generate the summarization based on the one or more scene importance metrics.

11. The electronic device of claim 10, wherein the at least one processing device is further configured to:

perform an alignment of the first scene detection results, the second scene detection results, and genre data, including mapping the first scene detection results, the second scene detection results, and the genre data into a same latent space; and perform a self-attention process to merge the first scene detection results, the second scene detection results, and the genre data.

12. The electronic device of claim 11, wherein the streaming multimodal video generation model includes:

a transformer-based model configured to create the prompt text using inputs based on the one or more outputs from the GMT model;

a diffusion model configured to generate an image frame based on the prompt text; and a consistency control model configured to evaluate a contrastive loss using the prompt text and a previously generated image frame from the diffusion model.

13. The electronic device of claim 8, wherein, to create the prompt text, the at least one processing device is further configured to:

track the one or more user preferences over a period of time;

generate, using a behavior description model, a user behavior description summarizing the tracked one or more user preferences over the period of time; and generate a script using the user behavior description.

14. The electronic device of claim 13, wherein the streaming multimodal video generation model includes:

a diffusion model configured to receive the script as the prompt text and generate an image frame based on the prompt text;

a consistency control model configured to evaluate a contrastive loss using the prompt text and a previously generated image frame from the diffusion model; and a frame post-processing model for combining the image frames into the multimedia content result.

15. A non-transitory machine readable medium comprising instructions that when executed cause at least one processor of an electronic device to:

acquire video data and audio data associated with a multimedia content item;

perform a first scene detection process on the video data to produce first scene detection results, wherein the first scene detection process divides the video data into separate video scenes;

perform a second scene detection process on the audio data to produce second scene detection results, wherein the second scene detection process divides the audio data into separate audio scenes;

generate a multimedia content result using a streaming multimodal video generation model, wherein the instructions when executed further cause the at least one processing device to:

create prompt text based on one or more user preferences;

generate image frames based on the prompt text;

compile the image frames into the multimedia content result; and display the multimedia content result on a display.

16. The non-transitory machine readable medium of claim 15, wherein the instructions when executed further cause the at least one processor of the electronic device to:

determine combined scene detection results based on the first scene detection results and the second scene detection results;

input at least a portion of the combined scene detection results into a genre-specific multimodal transformer (GMT) model; and generate the multimedia content result as a summarization for the multimedia content item using one or more outputs from the GMT model.

17. The non-transitory machine readable medium of claim 16, wherein the instructions that when executed cause the at least one processor of the electronic device to generate the multimedia content result as the summarization for the multimedia content item further include instructions that when executed cause the at least one processor of the electronic device to:

determine one or more scene importance metrics based on the one or more user preferences and the one or more outputs from the GMT model, wherein the one or more outputs of the GMT model include a scene importance score and a predicted genre; and generate the summarization based on the one or more scene importance metrics.

18. The non-transitory machine readable medium of claim 17, wherein the instructions when executed further cause the at least one processor of the electronic device to:

perform an alignment of the first scene detection results, the second scene detection results, and genre data, including mapping the first scene detection results, the second scene detection results, and the genre data into a same latent space; and perform a self-attention process to merge the first scene detection results, the second scene detection results, and the genre data.

19. The non-transitory machine readable medium of claim 18, wherein the streaming multimodal video generation model includes:

a transformer-based model configured to create the prompt text using inputs based on the one or more outputs from the GMT model;

a diffusion model configured to generate an image frame based on the prompt text; and a consistency control model configured to evaluate a contrastive loss using the prompt text and a previously generated image frame from the diffusion model.

20. The non-transitory machine readable medium of claim 15, wherein the instructions that when executed cause the at least one processor of the electronic device to create the prompt text further include instructions that when executed cause the at least one processor of the electronic device to:

track the one or more user preferences over a period of time;

generate, using a behavior description model, a user behavior description summarizing the tracked one or more user preferences over the period of time; and generate a script using the user behavior description.

\* \* \* \* \*